April 22, 1952     E. M. NYE ET AL     2,593,785
COMBINED AIRCRAFT AND AUTOMOBILE
Filed Dec. 12, 1945     2 SHEETS—SHEET 1
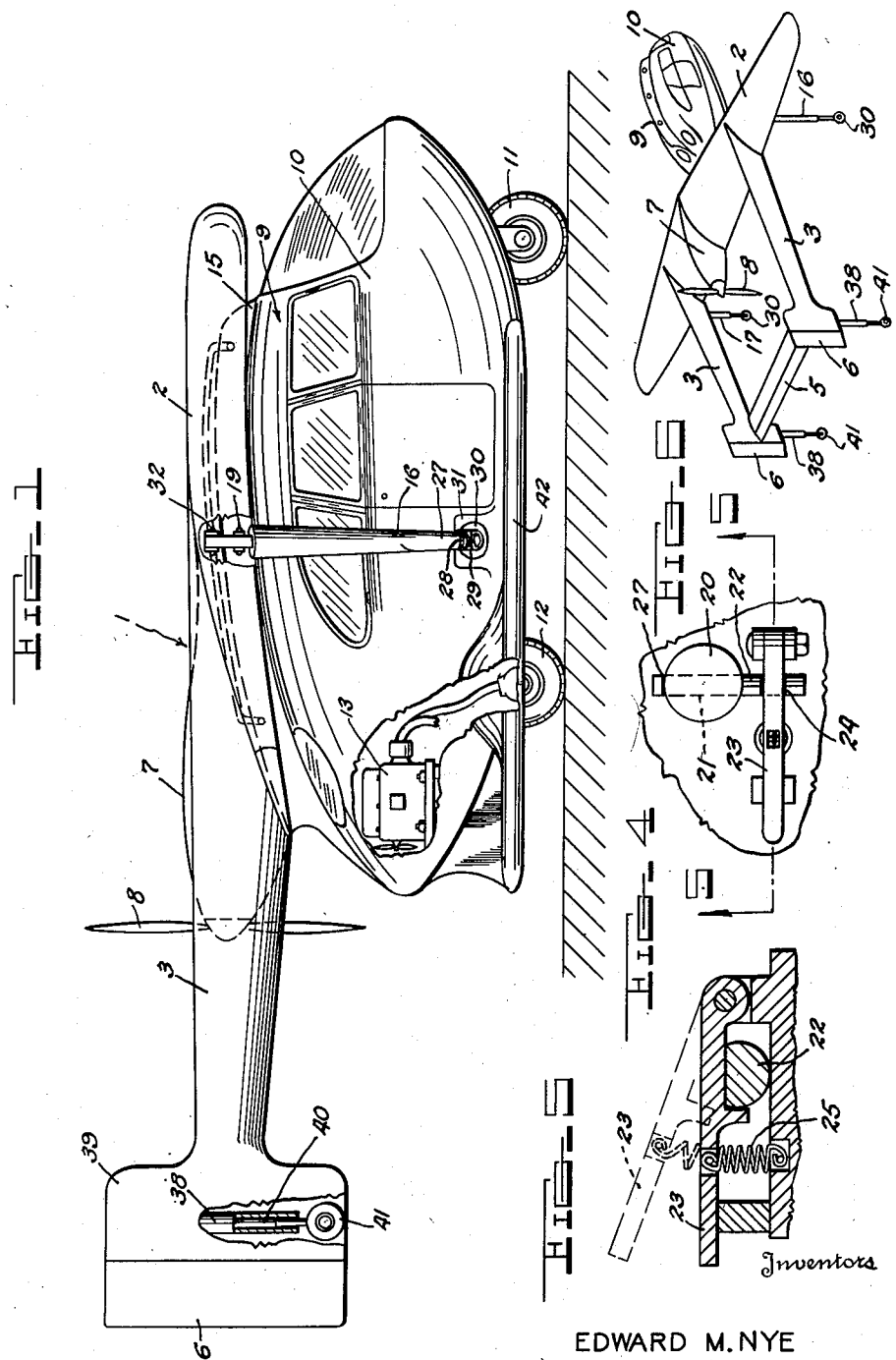
Inventors
EDWARD M. NYE
ALPHONSE POISSON April 22, 1952 E. M. NYE ET AL 2,593,785
COMBINED AIRCRAFT AND AUTOMOBILE
Filed Dec. 12, 1945 2 SHEETS—SHEET 2
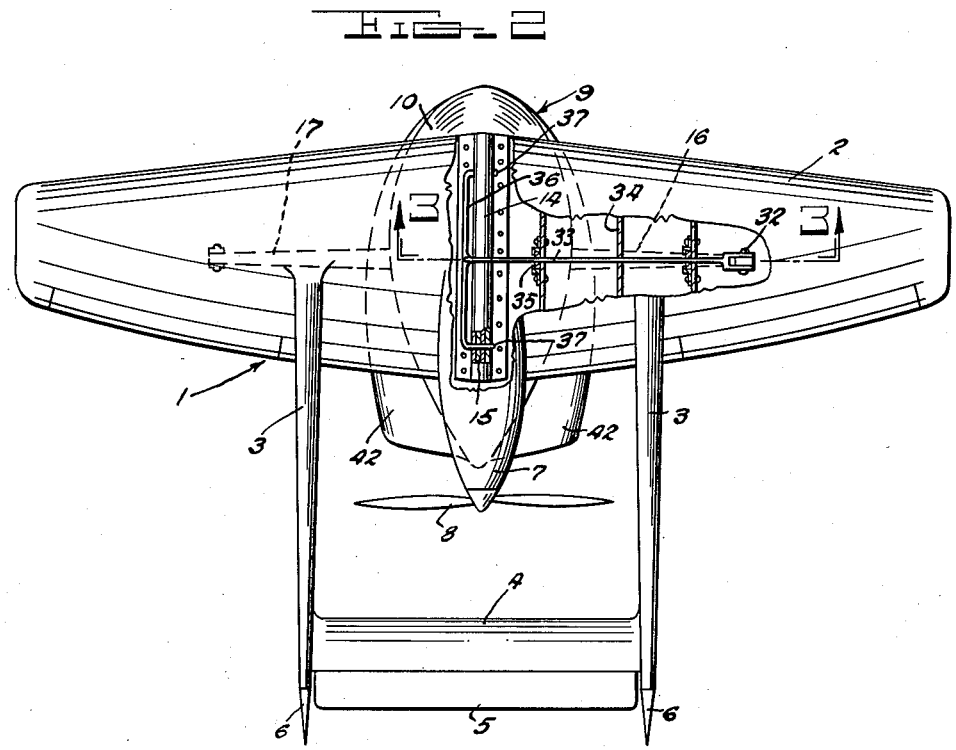
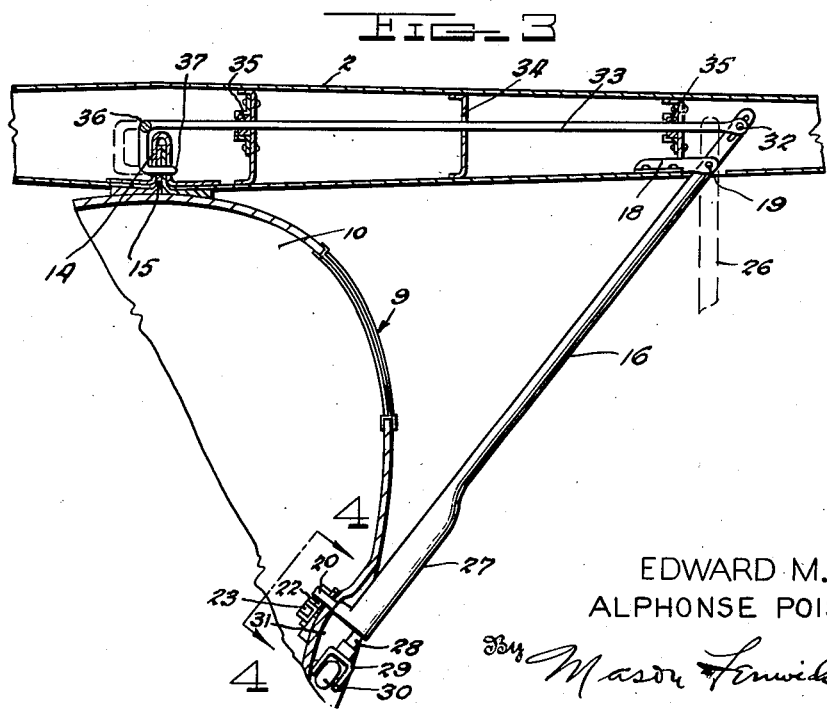
Inventors
EDWARD M. NYE
ALPHONSE POISSON Patented Apr. 22, 1952

2,593,785

UNITED STATES PATENT OFFICE 2,593,785

COMBINED AIRCRAFT AND AUTOMOBILE

Edward M. Nye, Elysburg, and Alphonse Poisson, Sunbury, Pa.

Application December 12, 1945, Serial No. 634,446

6 Claims. (Cl. 244—2)

This invention relates to vehicles of the combined automobile aeroplane type, in which the cabin portion of the aeroplane is detachable from the airplane structure and has ground wheels driven by its own power plant so that it is in fact an automobile which can be detached from the airplane structure at the airport, leaving the airplane unit parked at the airport while the automobile unit is driven into the city. Since airports are generally at an inconvenient distance from the towns which they serve, a combination vehicle of this type is of great value in enabling one to realize the full benefit of quick aerial transportation.

The general object of the present invention is to provide an autoplane which may be readily converted into a ground vehicle, or vice versa, in the minimum interval of time.

Another object of the invention is to provide an autoplane in which the conversion is made without impairing its safety factor as an air borne vehicle.

More specifically, the objects of the invention are to provide an autoplane in which the strut which braces the wing from the cabin is the element which effects the attachment or release of the cabin with respect to the airplane unit; to provide, between the airplane unit and cabin a channel track on the one, slidably receiving a rib on the other, with strut operated draw bolts, or their equivalent, for securing together the rib and channel; to provide a hinged strut which when latched into the body or automobile unit, maintains the track and channel locked together, and when unlocked from the body and swung to vertical position, automatically unlocks the rib from the channel, and at the same time affords ground support for the airplane unit; to provide, auxiliary to the struts, one or more ground supports carried by the tail empennage, said struts and auxiliary supports having power extensible sections with wheels or rollers at their lower ends, whereby the airplane unit may be power lifted when unlocked from the automobile unit, a sufficient distance to permit the automobile unit to be driven out from under it, or to be backed under it in position to be reattached. The ground wheels at the ends of the struts and auxiliary supports permit the airplane unit to be pushed off of the runway and into a convenient parking area after the automobile has departed.

Another object of the invention is to provide the airplane and automobile units with independent power plants, the automobile power plant being relatively small, so that it contributes but a small proportion of weight to the combined vehicle.

Other objects of the invention will appear as the following description of a preferred and practical embodiment thereof proceeds, reference being had to the drawings which accompany and form a part of the following specification.

In the drawings:

Figure 1 is a side elevation of an autoplane embodying the features of the invention;

Figure 2 is a plan view, partly in section;

Figure 3 is a transverse vertical section taken along the line 3—3 of Figure 2;

Figure 4 is a front view of the strut lock, taken in the direction indicated by the arrows at the ends of the line 4—4 in Figure 3;

Figure 5 is a section taken along the line 5—5 of Figure 4;

Figure 6 is a diagrammatic perspective view of the airplane unit, ground supported, with the automobile unit detached.

Referring now in detail to the several figures, the numeral 1 represents as a whole, the airplane unit comprising the wing 2, twin booms 3, the latter being joined by the tail horizontal stabilizer 4, carrying the elevator 5, the booms having the usual vertical rudders 6 at their rear end. The airplane unit is driven by a single motor 7 of the pusher type, which operates the propeller 8. The cabin of the autoplane, which is also the detachable automobile unit, is represented as a whole by the reference character 9. It comprises a light enclosing body 10, having a single steerable wheel 11 at the front and a pair of spaced driving wheels 12 at the rear, the latter being driven by a small automobile engine 13.

The wheels 11 and 12 not only serve as the landing wheels of the autoplane, but as the vehicle wheels of the automobile unit.

The autoplane, as shown, is of the parasol type, in which the cabin depends from the wing 2. Figure 2 shows that a channel track 14 is built into the wing structure, opening on the under side of the wing, and extending longitudinally of the autoplane, and that the top of the cabin 10 is provided with an upstanding rib 15, longitudinally slidable within the channel. The rib and channel are secured together, in a manner presently to be described, and the wing and cabin are braced by the inclined struts 16 and 17, symmetrically arranged on opposite sides of the median vertical longitudinal plane of the autoplane, secured to the wing at intermediate points and to opposite sides of the body. One of the struts 16 is shown in detail in Figure 3. It is hingedly connected to a bracket 18 in the wing, by means of the bolt 19. The lower end of the strut 16 has a lateral extension 20, which passes through an aperture in the side wall of the cabin 10 to the interior thereof, forming a bolt by means of which the strut is detachably secured to the cabin. The bolt 20 has a transverse bore 21 therethrough, in that part which extends within the cabin, into which a headed key 22 is inserted from the top, the key lying against the inside of the cabin wall and projecting beyond the lower side of the bolt. The key is retained from inadvertent displacement by means of the hinged keeper 23, which normally rests in a transverse notch 24 in the lower portion of the key, being pressed into said notch by the spring 25, shown in Figure 5. When it is desired to release the strut 16 from its connection to the body, the keeper 23 is raised against spring tension to the broken line position shown in Figure 5, whereupon the key 22 may be drawn out, releasing the bolt 20, so that the strut 16 can be swung to the vertical position indicated in broken lines at 26 in Figure 3. The strut carries at its lower end a hydraulic cylinder 27, in which a foot extension 28 telescopes, said extension terminating in a fork 29, carrying a ground wheel 30 between its furcations. In the design of cabin shown in Figure 3, the lower end of the strut 16, including the fork 29 and ground wheel 30, rest in a depression 31 in the side wall of the cabin when the strut is in locked position. The strut 17 is similar in its construction to the strut 16, insofar as the latter has up to this point been described, including the locking means, so that both struts can be released from the cabin and swung out to vertical position, when desired.

The strut 16 differs from the strut 17 in functioning to lock and release the rib 15 on the top of the cabin with respect to the channel track 14, carried by the wing. The strut 16 extends above the pivot bolt 19, within the wing, having a pin and slot connection 32 with a bolt actuating bar 33, the latter passing through apertures in the ribs 34 of the wing, slidable through bearings 35, carried by certain of said ribs, and rigidly connected at its inner end to a cross bar 36, (see Figure 2), carrying at spaced longitudinal intervals, bolts 37, which pass through respective aligned apertures in the rib and track. Any desired number of bolts 37 may be employed, three being used in the illustrative embodiment of the invention, of which two are clearly shown in Figure 2, the third being concealed beneath the actuating bar 33. It will be understood from Figure 3 that when the strut 16 is in locked position with respect to the cabin, its upper end has pulled the bolts through the aligned apertures in the rib and track, and locked these members securely together, but that when the strut 16 is swung to the vertical position, the actuating bar 33 is moved toward the left, withdrawing the bolts from the aligned apertures, releasing the rib from the track.

Figure 1 shows a hydraulic cylinder 38, arranged vertically within the vertical stabilizer 39, forwardly of the rudder 6, this cylinder being duplicated in both vertical stabilizers. Extensible supports 40 fit slidably within said cylinders, carrying at their lower ends the ground wheels 41. After the struts 16 and 17 have been swung to vertical position, hydraulic pressure is put upon the extensions 28 and 40, lifting the airplane unit with respect to the automobile unit, so as to disengage the track 14 from the rib 15 in a vertical direction, permitting the automobile unit to be driven out from under the airplane unit. This leaves the airplane unit supported upon the ground wheels 30 and 41. In this position it may readily be moved by hand or by a tractor to a convenient parking space off the runway. When the automobile unit returns, it may be backed under the airplane unit while the latter is still in elevated position until the rib 15 is beneath the channel of the track 14. The extensions 28 and 40 are then retracted, lowering the airplane unit upon the automobile unit, until the rib is fully seated within the track, in which position the apertures in said members are in registry, and in alignment with the bolts 17. The struts 16 and 17 may then be swung to inclined position and locked with respect to the side walls of the cabin. The locking of the strut 16 to the cabin wall locks the bolts 37 against displacement.

In the design of cabin shown, horizontal air foils 42 extend laterally from the cabin body beneath the wing 2, and function to the extent of their area, in the same manner as the lower wing of a biplane. In taxiing for a take-off, the motor 13 of the automobile unit drives the wheels 12, thus materially assisting the propeller in gaining speed for the take-off.

While we have in the above disclosure described what we believe to be a preferred and practical embodiment of the invention, it will be understood by those skilled in the art that the specific type of airplane to which the invention is applied is by way of illustration, that the means by which the wheels 12 of the automobile unit are driven from the engine 13 are a matter of choice, that the means for operating the airplane controls and shifting from these to the control of the automobile, as well as the means for operating the hydraulic system which actuates the extensions 38 and 40, are no part of the present invention, and that the specific details of construction and arrangement of parts may be varied without transcending the scope of the invention.

What we claim as our invention is:

1. In aircraft, a wing unit and an automobile unit, means for detachably securing said automobile unit to said wing whereby the automobile unit becomes the cabin, and the automobile wheels the landing wheels, of the aircraft, upwardly divergent swingable struts at opposite sides of the aircraft hinged in the wing unit and releasably locked to the automobile unit, one of said struts being operably connected to said detachable securing means for detaching said automobile unit from said wing unit when said strut is swung away from said automobile unit, said struts when in vertical position affording ground support for said wing unit.

2. In aircraft, a wing unit and an automobile unit, means for detachably securing said automobile unit to said wing unit whereby the automobile unit becomes the cabin and the automobile wheels the landing wheels of the aircraft, upwardly divergent swingable struts at opposite sides of the aircraft, hinged at the wing unit and releasably locked to the automobile unit, one of said struts being operably connected to said detachable securing means for detaching said automobile unit from said wing unit when said strut is swung away from said automobile unit, said struts having power operated extensible ground engaging sections affording ground support for said wing unit when said struts are in vertical position, a vertical power operated ground engaging extensible section carried by said wing unit at a third point out of alignment with said extensible strut sections, all of said extensible sections being operable to lift said wing unit relative to said automobile unit.

3. In aircraft, a wing unit and an automobile unit, a longitudinal rib on one unit interfitting into a longitudinal channel member on the other unit, registering apertures in said rib and channel members, bolts passing through said registering apertures for detachably securing said automobile unit to said wing unit whereby the automobile unit becomes the cabin, and the automobile wheels the landing wheels of the aircraft, a bar slidable in the wing unit for actuating said bolts to move them either to locked or released position, upwardly divergent swingable struts at opposite sides of the aircraft hinged in the wing unit and releasably locked to the automobile unit, one of said struts being connected to said bar for actuating said bolts to move them respectively to secured or detached position when said strut is swung towards or away from said automobile unit, said struts and the rear portion of said wing unit having power operated extensible ground engaging extensions affording ground support for said wing unit at at least three points when said struts are in vertical position, said extensible sections being operable to lift said wing unit relative to said automobile unit.

4. In aircraft, a wing unit including a wing and an automobile unit including a body enclosure and an air foil extension from the lower part of said body enclosure substantially parallel to said wing, means for detachably securing said automobile unit to said wing unit whereby the body enclosure of the automobile unit becomes the cabin of the aircraft, and having wheels which become the landing wheels of the aircraft, upwardly divergent swingable struts at opposite sides of the aircraft hinged in the wing and releasably locked to the body enclosure of the automobile unit, one of said struts being operably connected to said detachable securing means for detaching said automobile unit from said wing unit when said strut is swung away from said automobile unit, and independent power plants for said wing unit and automobile unit.

5. In aircraft, a wing unit and a cabin, means for detachably securing said cabin to said wing unit, a pair of wing supporting swingable struts connecting said wing unit and cabin on opposite sides of said aircraft, hinged to the wing unit and releasably locked to the cabin, one of said struts being operatively connected to said detachable securing means for detaching said cabin from said wing unit when said strut is swung away from said cabin.

6. In aircraft, a wing unit and an automobile unit, means for detachably securing said automobile unit to said wing unit whereby the automobile unit becomes the cabin and the automobile wheels the landing wheels of the aircraft, a pair of wing supporting swingable struts connecting said wing unit and automobile unit at opposite sides of said aircraft, hinged to the wing unit and releasably locked to the automobile unit, one of said struts being operatively connected to said detachable securing means for detaching said automobile unit from said wing unit when said strut is swung away from said automobile unit.

EDWARD M. NYE.
ALPHONSE POISSON.

REFERENCES CITED

The following references are of record in the file of this patent:

UNITED STATES PATENTS

| Number | Name | Date |
|---|---|---|
| 1,466,634 | Tarbox | Aug. 28, 1923 |
| 1,825,592 | Johnson | Sept. 29, 1931 |
| 2,156,288 | Holliday | May 2, 1939 |
| 2,215,003 | Johnson | Sept. 17, 1940 |
| 2,241,577 | Beals | May 13, 1941 |
| 2,373,467 | Frakes | Apr. 10, 1945 |
| 2,430,869 | Fulton | Nov. 18, 1947 |